United States Patent [19]

Kodama et al.

[11] 4,422,520

[45] Dec. 27, 1983

[54] TRANSMISSION APPARATUS FOR FOUR-WHEEL DRIVE MOTOR VEHICLE

[75] Inventors: Masayuki Kodama, Hachioji; Sadao Makishima, Akigawa, both of Japan

[73] Assignee: Fuji Jukogyo Kabushiki Kaisha, Tokyo, Japan

[21] Appl. No.: 210,873

[22] Filed: Nov. 28, 1980

[30] Foreign Application Priority Data

Nov. 29, 1979 [JP] Japan .................. 54-154624

[51] Int. Cl.³ ............................................. B60K 17/34
[52] U.S. Cl. .................................................. 180/247
[58] Field of Search ............... 180/297, 247, 248, 249, 180/250, 241

[56] References Cited

U.S. PATENT DOCUMENTS 2,705,539  4/1955  Martin ............................. 180/297 X
3,451,574  6/1969  Weichel .......................... 180/297 X
3,580,350  5/1971  Arkus-Duntov .................... 180/248

FOREIGN PATENT DOCUMENTS 887849  1/1962  United Kingdom .

Primary Examiner—John A. Pekar
Attorney, Agent, or Firm—Martin A. Farber

[57] ABSTRACT

A transmission apparatus for a motor vehicle having an internal combustion engine transversely disposed in the vehicle, a transmission transversely disposed and connected to the crankshaft of the engine through a clutch, a final reduction gear engaged with an output gear of the transmission, a differential secured to a side of the final reduction gear and disposed at a substantially central position of the vehicle, and an axle connected to the differential. A transfer device is connected to the final reduction gear and disposed adjacent the differential. The transfer device comprises a supporting shaft, a gear engaged with the final reduction gear, a clutch, and a first bevel gear. A second bevel gear is engaged with the first bevel gear, and a centrally located propeller shaft is operatively connected to the second bevel gear for driving another axle for the four-wheel drive.

12 Claims, 3 Drawing Figures

TRANSMISSION APPARATUS FOR FOUR-WHEEL DRIVE MOTOR VEHICLE

BACKGROUND OF THE INVENTION

The present invention relates to a transmission apparatus for a motor vehicle in which the engine is transversely disposed in the front or rear of the vehicle and the output of the engine is selectively transmitted to the front and rear axles of the vehicle through the transmission.

In the four-wheel drive vehicle, the propeller shaft must be provided for transmitting the output of the engine to the axle of the other side of the vehicle. The propeller shaft should be disposed about the longitudinal center line of the vehicle. If the propeller shaft also deviates from the center line, the differential for the axle is also deviated. As a result, right and left portions of the axle from the differential are different in length. Such an asymmetrical axle causes various disadvantages such as unbalance of weight and suspension. However, it is difficult to dispose the propeller shaft about the center line in a vehicle of the type in which the engine is transversely disposed, since the output end of the transmission for coupling the propeller shaft is positioned at one lateral side portion of the vehicle.

SUMMARY OF THE INVENTION

The object of the present invention is to provide a transmission apparatus in which a propeller shaft may be disposed about the longitudinal center line of the vehicle. According to the present invention there is provided a transmission apparatus for a motor vehicle having an internal combustion engine transversly disposed in the vehicle, a transmission transversely disposed and connected to the crankshaft of the engine through a a clutch, a final reduction gear engaged with an output gear of the transmission, a differential with its case secured to a side of the final reduction gear and disposed at a substantially central position of the vehicle, and an axle connected to the differential; a transfer device connected to the final reduction gear and disposed adjacent the differential; the transfer device comprising a transversely extending supporting shaft, a first gear engaged with the final reduction gear, and a clutch releasably engageable with the first gear and jointly rotatably mounted on the supporting shaft, and first bevel gear jointly rotatably mounted on the supporting shaft; a second bevel gear engaged with the first bevel gear; and a centrally located propeller shaft operatively connected to the second bevel gear for driving another axle for the four-wheel drive.

With the above and other objects and advantages in view, the present invention will become more clearly understood in connection with the detailed description of a preferred embodiment, when considered with the accompanying drawings, of which:

DETAILED DESCRIPTION OF THE PREFERRED EMBODIMENTS

Figure 1:
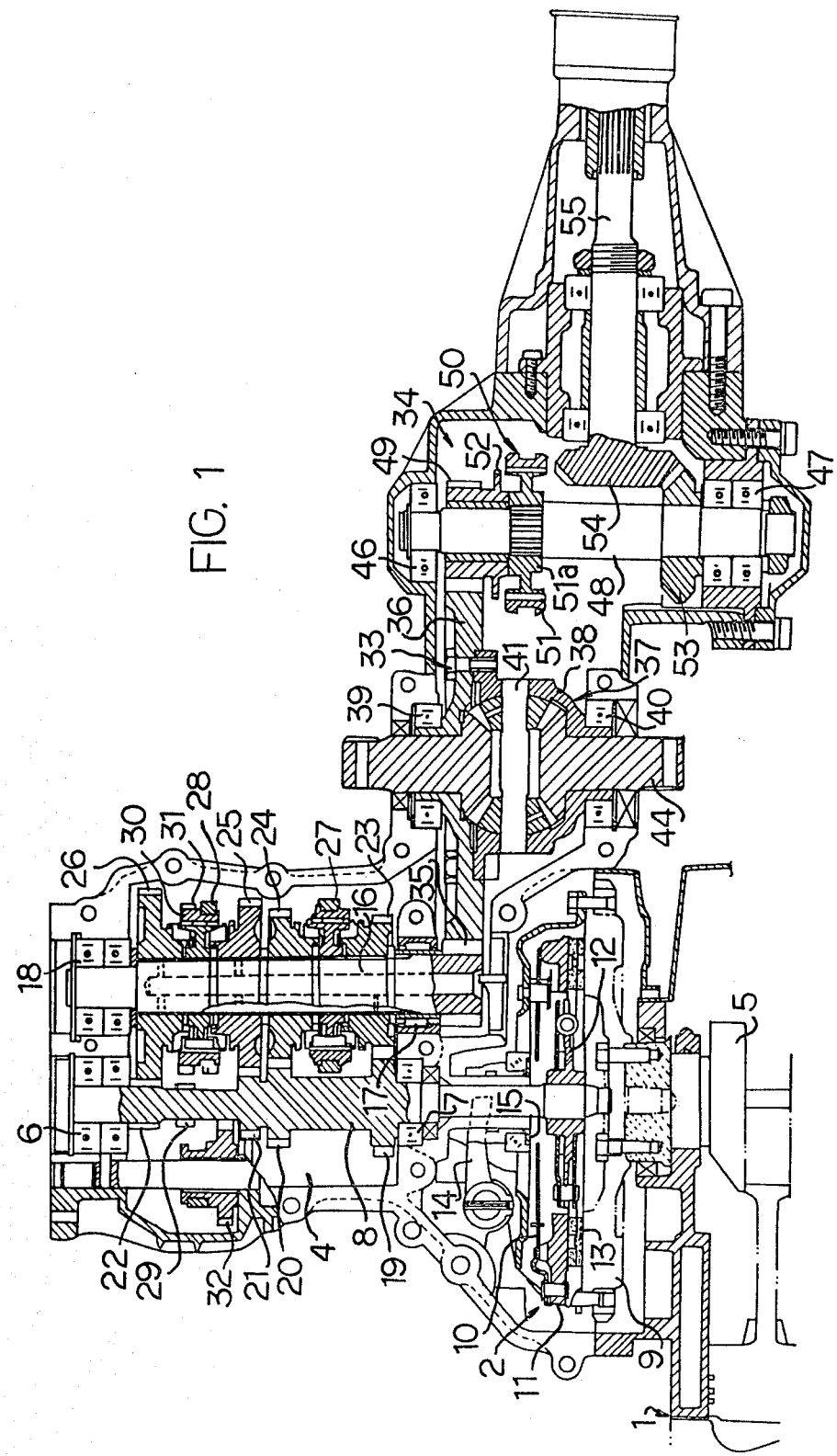
FIG. 1 is a sectional view of an embodiment of the present invention.

Referring to the drawings, numeral 1 designates an engine transversely oriented in a vehicle at the front end (although not limited thereto) thereof. A transmission 4 is disposed in alignment with a crankshaft 5 of the engine. A main drive shaft 8 of the transmission 4 is rotatably supported by bearings 6 and 7 and is adapted to be coupled to the engine through a clutch 2. The clutch 2 comprises, as well known, a flywheel 9 secured to the crankshaft 5, a diaphragm spring 10, a pressure plate 11, a clutch disc 12 having a facing 13, a release arm 14, and a release bearing 15.

A sub-drive shaft 16 is disposed in parallel with the main drive shaft 8, supported by bearings 17 and 18. The main drive shaft 8 has a gear 19 for the fourth speed, a gear 20 for the third speed, a gear 21 for the second speed and a gear 22 for the first speed. Rotatably mounted on the sub-drive shaft 16, are gears 23, 24, 25 and 26 respectively engaged with gears 19 to 22. Between the gears 23 and 24, a synchromesh device 27 is provided for coupling the gear 23 or 24 to the sub-drive shaft 16 for the fourth and third speeds. A synchromesh device 28 is similarly provided between the gears 25 and 26 for the second and first speeds. Further, a gear 29, a gear 31 provided on the sleeve 30 of the synchromesh device 28 and an idler gear 32 are provided for the reverse drive.

In this apparatus, the output of the transmission is transmitted from an output gear 35 secured to the inner end of the sub-drive shaft 16 to a final reduction device 33 and from the latter to a transfer device 34. The output gear 35 engages with a final reduction gear 36 of a differential 37, the gear 36 being secured to a differential case 38 of the differential 37. The differential further comprises a shaft 41, pinions 42 and side gears 43 each of which have an output shaft 44. Each shaft 44 is connected to a front axle 45 through a joint. The differential case is positioned at the inner side of the final reduction gear, so that the differential may be located in a substantially central region of the width of the vehicle.

The final reduction gear 36 engages with a gear 49 to the transfer device 34. The gear 49 is rotatably mounted on a shaft 48 of the transfer device 34, which shaft is oriented and supported by bearings 46 and 47 at both ends. The transfer device 34 further comprises a clutch 50 which comprises an axially non-displaceable clutch hub 51a jointly rotatably engaged with the shaft 48 by splines, a sleeve 51 transversely slidably mounted on the clutch hub 51a but jointly rotatably engaged with the clutch hub 51a by splines, and splines 52 provided on the side of gear 49. The sleeve 51 is shifted by a shift lever (not shown) for engaging the splines of the sleeve 51 with the splines 52 thereby to couple the gear 49 jointly rotatably to the shaft 48. A bevel bear 53 is secured to the shaft 48 at the end of the shaft 48 at a position on the shift so that it engages with a bevel gear 54 secured to a drive shaft 55 which is longitudinally disposed about the center line of the vehicle. The clutch 50 and the pair of bevel gears 53 and 54 are disposed on the same side as the differential in relation to the final reduction gear 33, and further the gear 49, clutch 50 and the bevel gear 54 are closely positioned with respect to each other. Since the drive shaft 55 and the propeller shaft 57 are located about the center line of the vehicle and since the bevel gear 54 is coaxially mounted on the drive shaft 55 and in engagement with the bevel gear 53, the position of the latter on the supporting shaft 48 has been suitably selected during manufacture.

Therefore, the drive shaft 55 may be disposed about the center line of the vehicle.

In operation, the output of the engine 1 is transmitted to the main drive shaft 8 of the transmission 4 through the clutch 2 and further to the sub-drive shaft 16 by the engagement of the synchromesh device 27 or 28. The output of the transmission 4 at the output gear 35 is transmitted to the front axle 45 through the final reduction gear 36 and the differential 37 and also to the transfer gear 49. When the sleeve 51 of the clutch 50 is engaged with the splines 52 by manipulating the shift lever, the rotation of the gear 49 is transmitted to the shaft 48 through the clutch hub 51a. Thus, the output of the transmission is transmitted to the propeller shaft 55 through the bevel gears 53, 54 and to the rear axle. Thus, the vehicle is driven by a four-wheel drive.

Figure 2:
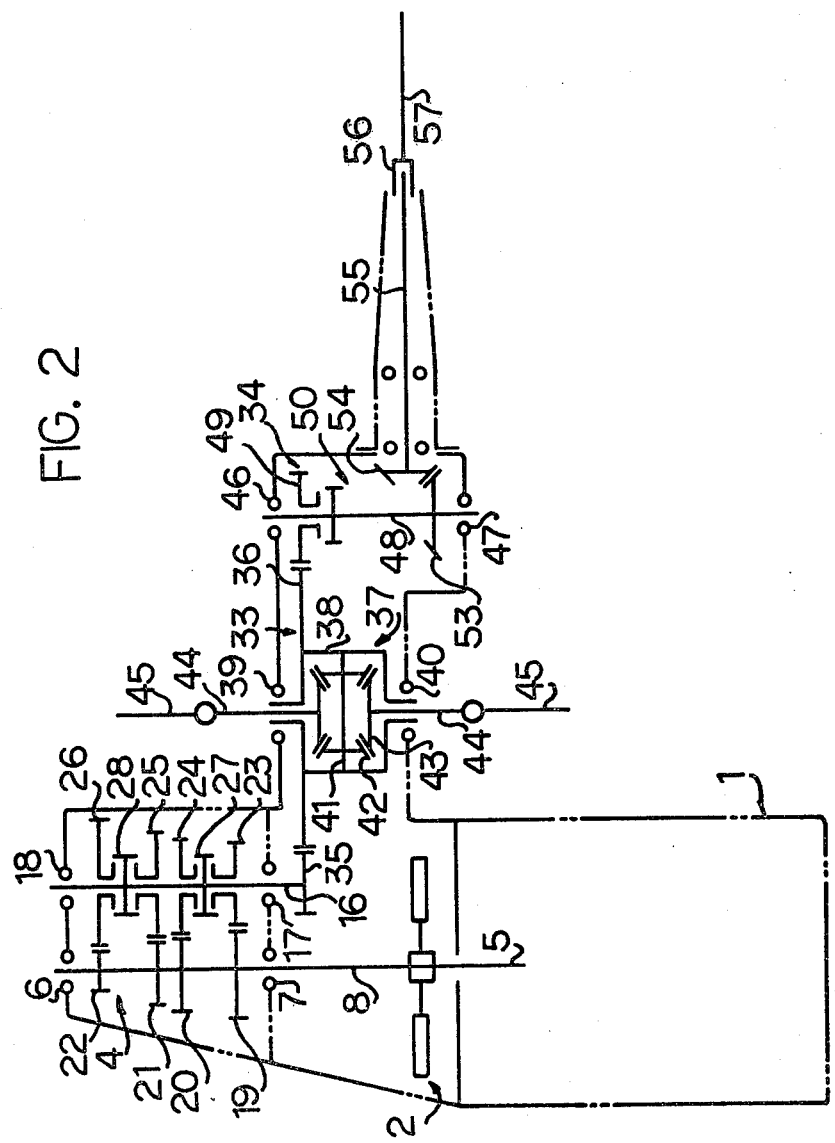
FIG. 2 is a schematic illustration of the apparatus of FIG. 1.
Figure 3:
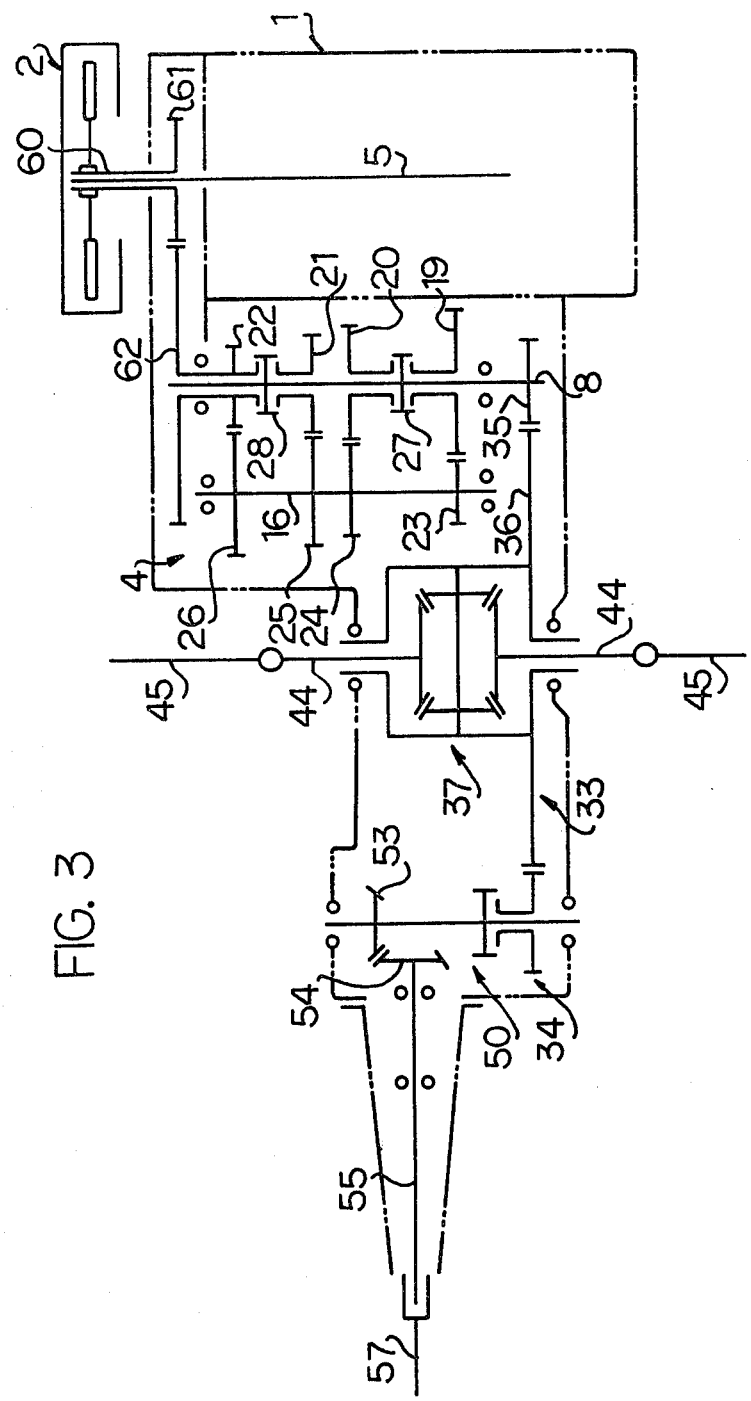
FIG. 3 is a schematic illustration of another embodiment of the present invention.

Referring to FIG. 3 showing another embodiment of the present invention, the transmission 4 is disposed in parallel to the engine 1. An output shaft 60 of the clutch 2 is tubular and co-axial with the crankshaft 5 of the engine 1. A gear 61 secured to the shaft 60 engages with a gear 62 rotatably mounted on the main drive shaft 8 of the transmission 4. The gear 22 for the first speed is secured to the gear 62. The gear 21 for the second speed, gear 20 for the third speed and gear 19 for the fourth speed are rotatably mounted on the shaft, respectively. Gears 23–26 respectively engaged with gears 19–22 are secured to the sub-drive shaft 16. The output gear 35 is secured to the main drive shaft 8, which engages with the final reduction gear 36. The differential 37 is secured to the inner side of the final reduction gear 36 so that the differential is disposed at a central position of the vehicle. The construction of the transfer device 34 and other device is the same as the first embodiment of FIGS. 1 and 2, and hence the propeller shaft 57 is disposed about the center line of the vehicle.

The output of the engine 1 is transmitted to the sub-drive shaft through the clutch 2, shaft 60, gears 61, 62 and gears 22–26. The output at the output gear 35 is transmitted to the front axle 45 through the final reduction gear 36 and differential 37 and also selectively to the rear axle through the transfer device 34, clutch 50, bevel gears 53 and 54 and propeller shaft 57.

In accordance with the present invention, the transfer device for the four-wheel drive is disposed adjacent the differential for the two-wheel drive, which is disposed at a central position of the vehicle. Accordingly, the propeller shaft for the four-wheel drive may be disposed about the center line of the vehicle.

What is claimed is:

1. In a transmission apparatus for a motor vehicle having an internal combustion engine disposed in said motor vehicle transversely relative to a longitudinal direction of said motor vehicle and a transmission disposed transversely relative to said longitudinal direction of said motor vehicle, said transmission being operatively connected to the crankshaft of said engine through a clutch, a differential including a final reduction gear engaged with an output gear of said transmission and a differential case secured to a side of said final reduction gear, said differential case being disposed at a substantially central region of said motor vehicle, and first transverse, wheel axles operatively connected to the differential case for being driven via the differential, the improvement comprising, said transmission being so arranged that said output gear is positioned at a substantially central region of said motor vehicle for engaging with said final reduction gear, a propeller shaft operatively drivingly connected to other transverse, wheel axles, said propeller shaft is oriented about a longitudinal center line of said motor vehicle, transfer means for operatively transfering torque from said final reduction gear to said propeller shaft, said transfer means including a supporting shaft and a gear mounted on said supporting shaft and engaged with said final reduction gear, a transfer clutch means mounted on said supporting shaft for coupling said gear with said supporting shaft, said supporting shaft being transversely disposed relative to said longitudinally direction of said motor vehicle, a first bevel gear secured on said supporting shaft, and means comprising a second bevel gear engaged with said first bevel gear for operatively driving said propeller shaft and further for driving said other transverse, wheel axles for a four-wheel drive.

2. The transmission apparatus for the motor vehicle according to claim 1 further comprising a pair of bearings, said supporting shaft of said transfer means is rotatably supported by said pair of bearings at both ends, said first bevel gear is secured to an end portion of said supporting shaft, and said second bevel gear is disposed between said final reduction gear and said first bevel gear whereby said propeller shaft is oriented about said center line of said motor vehicle.

3. The transmission apparatus for the motor vehicle according to claim 1, wherein said transfer means includes said gear engaging said final reduction gear and relatively rotatably mounted on said supporting shaft and said clutch means for selectively rotatably engaging with said first gear for transferring the torque of said final reduction gear to said supporting shaft and thereby to said propeller shaft, said clutch means is jointly rotatably mounted on said supporting shaft.

4. The transmission apparatus for a motor vehicle according to claim 3, wherein said second bevel gear is located adjacent said clutch means.

5. The transmission apparatus for a motor vehicle according to claim 3, further comprising a vehicle shift lever for shifting gears and speeds in said transmission simultaneously constituting means for shifting said clutch means for selectively rotatably engaging with said first gear.

6. The transmission apparatus for a motor vehicle according to claim 1, wherein said engine and said transmission are transversely linearly aligned.

7. The transmission apparatus for a motor vehicle according to claim 6, wherein said engine and said transmission are substantially on opposite sides of the longitudinal center line of the vehicle.

8. The transmission apparatus for a motor vehicle according to claim 1, wherein said engine and said transmission are parallel.

9. A method of designing an engine to wheel axle transmission arrangement in a motor vehicle for a four-wheel drive with a transmission connected to the engine, to first wheel axles and to a transfer device operatively connected between the transmission and a drive shaft, a propeller shaft located about a longitudinal center line of the vehicle, the propeller shaft being connected to the drive shaft and second wheel axles, the transfer device including a supporting shaft with a gear thereon operatively drivingly engaging the drive shaft, comprising the steps of orienting the supporting shaft transversely relative to the longitudinal center line of the vehicle, and orienting the engine and the transmission transversely relative to the longitudinal center line of the vehicle, selecting any desired transverse positions of the engine and the transmission depending upon requirements of the particular vehicle, and selecting an axial position of said gear on said supporting shaft such that said gear operatively engages said drive shaft when the supporting shaft is transversely oriented relative to the longitudinal center line of the vehicle.

10. In a transmission apparatus for a motor vehicle having an internal combustion engine disposed in said motor vehicle transversely relative to a longitudinal direction of said motor vehicle and a transmission disposed transversely relative to said longitudinal direction of said motor vehicle, said transmission being operatively connected to the crankshaft of said engine through a clutch, a differential including a final reduction gear engaged with an output gear of said transmission and a differential case secured to a side of said final reduction gear, said case being disposed at a substantially central region of said motor vehicle, and first transverse, wheel axles operatively connected to the differential case for being driven via the differential, the improvement comprising, a propeller shaft operatively drivingly connected to other transverse, wheel axles, said propeller shaft is oriented about a longitudinal center line of said motor vehicle, transfer means for operatively transfering torque from said final reduction gear to said propeller shaft, said transfer means including a supporting shaft operatively connected to said final reduction gear, said supporting shaft being transversely disposed relative to said longitudinal direction of said motor vehicle, a first bevel gear jointly rotatably secured on said supporting shaft, means comprising a second bevel gear engaged with said first bevel gear for operatively driving said propeller shaft for driving said other transverse, wheel axles for a four-wheel drive, and said first bevel gear being secured on said supporting shaft at a position on said supporting shaft such that said propeller shaft is oriented about said center line of said motor vehicle, a pair of bearings, said supporting shaft of said transfer means is rotatably supported by said pair of bearings at both ends, said first bevel gear is secured to an end portion of said supporting shaft, and said second bevel gear is disposed between said final reduction gear and said first bevel gear.

11. In a transmission apparatus for a motor vehicle having an internal combustion engine disposed in said motor vehicle transversely relative to a longitudinal direction of said motor vehicle and a transmission disposed transversely relative to longitudinal direction of said motor vehicle, said transmission being operatively connected to the crankshaft of said engine through a clutch, a differential including a final reduction gear engaged with an output gear of said transmission and a differential case secured to a side of said final reduction gear, said case being disposed at a substantially central region of said motor vehicle, and first transverse, wheel axles operatively connected to the differential case for being driven via the differential, the improvement comprising, a propeller shaft operatively drivingly connected to other transverse, wheel axles, said propeller shaft is oriented about a longitudinal center line of said motor vehicle, transfer means for operatively transfering torque from said final reduction gear to said propeller shaft, said transfer means including a supporting shaft operatively connected to said final reduction gear, said supporting shaft being transversely disposed relative to said longitudinal direction of said motor vehicle, a first bevel gear jointly rotatably secured on said supporting shaft, means comprising a second bevel gear engaged with said first bevel gear for operatively driving said propeller shaft for driving said other transverse, wheel axles for a four-wheel drive, and said first bevel gear being secured on said supporting shaft at a position on said supporting shaft such that said propeller shaft is oriented about said center line of said motor vehicle, said transfer means further includes a first gear engaging said final reduction gear and relatively rotatably mounted on said supporting shaft and clutch means for selectively rotatably engaging with said first gear for transferring the torque of said final reduction gear to said supporting shaft and thereby to said propeller shaft, said clutch means is jointly rotatably mounted on said supporting shaft.

12. The transmission apparatus for a motor vehicle according to claim 11, wherein said second bevel gear is located adjacent said clutch means.

* * * * *

UNITED STATES PATENT AND TRADEMARK OFFICE
CERTIFICATE OF CORRECTION

PATENT NO. : 4,422,520
DATED : December 27, 1983
INVENTOR(S) : Masayuki Kodama, et al It is certified that error appears in the above-identified patent and that said Letters Patent are hereby corrected as shown below:

Column 6, line 15, after "to" insert --said--.

Signed and Sealed this

Third Day of April 1984

[SEAL]

Attest:

GERALD J. MOSSINGHOFF

Attesting Officer

Commissioner of Patents and Trademarks